(12) United States Patent
Jebara

(10) Patent No.: US 7,788,191 B2
(45) Date of Patent: Aug. 31, 2010

(54) ORDERED DATA COMPRESSION SYSTEM AND METHODS USING PRINCIPLE COMPONENT ANALYSIS

(75) Inventor: Tony Jebara, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1321 days.

(21) Appl. No.: 11/132,078

(22) Filed: May 18, 2005

(65) Prior Publication Data
US 2005/0265618 A1    Dec. 1, 2005

Related U.S. Application Data

(63) Continuation of application No. PCT/US03/41399, filed on Dec. 29, 2003.

(60) Provisional application No. 60/436,597, filed on Dec. 26, 2002.

(51) Int. Cl.
*G06F 15/18* (2006.01)
(52) U.S. Cl. .......................... 706/12; 382/243
(58) Field of Classification Search ............ 706/12; 382/243

See application file for complete search history.

(56) References Cited

U.S. PATENT DOCUMENTS 5,379,352 A    1/1995    Sirat et al.

(Continued)

OTHER PUBLICATIONS

Davie et al ("3D Statistical Shape Models Using Direct Optimisation of Description Length" 2002).*

(Continued)

*Primary Examiner*—Donald Sparks
*Assistant Examiner*—Lut Wong
(74) *Attorney, Agent, or Firm*—Mark A. Catan; Miles & Stockbridge P.C.

(57) ABSTRACT

Methods and systems are provided for encoding, transmission and decoding of vectorized input data, for example, video or audio data. A convex invariance learning framework is established for processing input data or a given data type. Each input vector is associated with a variable transformation matrix that acts on the vector to invariantly permute the vector elements. Joint invariance and model learning is performed on a training set of invariantly transformed vectors over a constrained space of transformation matrices using maximum likelihood analysis. The maximum likelihood analysis reduces the data volume to a linear subspace volume in which the training data can be modeled by a reduced number of variables. Principal component analysis is used to identify a set of N eigenvectors that span the linear subspace. The set of N eigenvectors is used a basis set to encode input data and to decode compressed data.

19 Claims, 14 Drawing Sheets

U.S. PATENT DOCUMENTS

| | | | |
|---|---|---|---|
| 5,774,569 | A | 6/1998 | Waldenmaier |
| 6,167,156 | A | 12/2000 | Antoniades et al. |
| 6,182,216 | B1 | 1/2001 | Luyster |
| 6,573,890 | B1 | 6/2003 | Lengyel |
| 6,952,682 | B1 | 10/2005 | Wellman |
| 2003/0198389 | A1 | 10/2003 | Wenzel et al. |
| 2005/0243736 | A1 | 11/2005 | Faloutsos et al. |
| 2006/0253418 | A1 | 11/2006 | Charnock et al. |
| 2007/0185871 | A1 | 8/2007 | Canright et al. |
| 2008/0071764 | A1 | 3/2008 | Omi et al. |
| 2008/0243735 | A1 | 10/2008 | Rish et al. |
| 2008/0256034 | A1 | 10/2008 | Chang et al. |

OTHER PUBLICATIONS

Kotcheff et al ("Automatic construction of eigenshape models by direct optimization" 1998).*

Matas et al ("Object Recognition using the Invariant Pixel—Set Signature" 2000).*

Tony Jebara ("Images as Bags of Pixels" 2003).*

"Algorithm for Many to One Assignment Problems," IBM Technical Disclosure Bulletin, May 1973, vol. 15, No. 12, p. 51.

S. Gold, C. P. Lu, A Rangarajan, S. Pappu, and E. Mjolsness, "New algorithms for 2D and 3D point matching: Pose estimation and correspondence," Neural Information Processing Systems 7, 1995.

Frey and N. Jojic, "Estimating mixture models of images and inferring spatial transformation using the EM algorithm," Computer Vision and Pattern Recognition 1999.

Jebara, Tony and Shchogolev, Vlad, *B-Matching for Spectral Clustering*, Dept. of Computer Science, Columbia University, New York, NY.

Zha, H., *Summarization: Generic summarization and keyphrase extraction using mutual reinforcement principle and sentence clustering*, Proceeding of the 25$^{th}$ annual international ACM SIGIR conference on Research and development in information retrieval, Aug. 2002, p. 116, section 3.3, p. 117, right column, paragraph 2.

Hanson, A.J., *Constrained optimal framings of curves and surfaces using quatemion Gauss maps*, Proceeding Visualization, Oct. 18-23, 1998, p. 375, Abstract.

Jakobson D. and Rivin, I., *Extremal metrics on graphs*, Forum Math, 14(1), 2002.

* cited by examiner

A Convex Program over the Transformation Matrices

Vectorization versus Collection of Tuples (a) Original images (b) PCA reconstruction (c) Coil reconstruction (a) Face Images (a) Close talking mike (b) Wide area mike

ORDERED DATA COMPRESSION SYSTEM AND METHODS USING PRINCIPLE COMPONENT ANALYSIS

CROSS-REFERENCE TO RELATED APPLICATIONS

This application is a continuation of International Application No. PCT/US03/041399, filed Dec. 29, 2003, published Jul. 22, 2004, which claims the benefit of U.S provisional application No. 60/436,597 filed Dec. 26, 2002, each of which are incorporated by reference in their entireties herein, and from which priority is claimed.

FIELD OF THE INVENTION

This invention relates to machine learning techniques for processing data for recognition and classification. More particularly, the invention relates to data representation and invariance learning, and to the modeling of the represented data.

BACKGROUND OF THE INVENTION

Large quantities or volumes of raw data can be generated and manipulated by today's computers. Yet, the large volumes of raw data may be meaningful only when the data is mathematically simplified (e.g., classified) or described by models. The models may describe the raw data with a reduced number of variables, and thereby allow the volumes of raw data to be advantageously compressed and processed. The modeling of data can be based on theory (e.g., physics) or on statistical analysis. Common statistical analysis methods that are used for data modeling include maximum likelihood estimation, principal component analysis (PCA), and discriminative methods.

Recent progress in discriminative learning, support vector machines and regularization theory have encouraged the view that a data model may be estimated or learned from the raw data by minimizing penalty functions, e.g., linear classification constraints, on the model. An important aspect of these formalisms is that their learning algorithms generate solvable convex programs having convenient computational properties. Traditional machine learning methods have focussed on estimating models (generative or discriminative) from vectorial data. However, non-vectorial data or non-Euclidean data such as strings, images, audio and video require invariance and representation learning to recast the data in a form from which a useful model can be learned.

The proper representation for images and visual data is critical for computer vision applications. The initial manner in which visual or image information is parameterized, image features are extracted, and images are mathematically described or otherwise specified is an active area of current research. The success of subsequent computer vision application modules (e.g., for image recognition, segmentation, tracking, and modeling) often rests on the initial representation chosen. Image invariance has been successful exploited to represent data for computer vision applications. For example, in image recognition or matching modules, the solution of the so-called correspondence problem utilize the permutational invariance of pixels in images. See e.g., S. Gold, C. P. Lu, A Rangarajan, S. Pappu, and E. Mjolsness, "New algorithms for 2D and 3D point matching: Pose estimation and correspondence," Neural Information Processing Systems 7, 1995. Further, flexible specification of permutational invariance and other image invariants and their reliable estimation remains an important goal of machine learning in computer vision applications.

Prior attempts in uncovering invariant representations often involved particular iterative methods, which unfortunately are incompatible or inconsistent within subsequent model estimation algorithms. Further, these iterative methods also suffer from local minima, which lead to false or unreliable results. For example, B. Frey and N. Jojic, "Estimating mixture models of images and inferring spatial transformation using the EM algorithm," Computer Vision and Pattern Recognition 1999, describes using learning transformations for generative models that require an iterative Expectation Maximization (EM) or variational implementation, and also a discrete enumeration of all possible transforms. Similarly, other known iterative techniques such as congealing may uncover image rotations, but also suffer from local minima and do not scale to model estimation frameworks (e.g., discriminative model frameworks). Further, for example, known correspondence algorithms for image registration and alignment also suffer from local minima problems and require relaxation or annealing.

Consideration is now being given to improving methods for uncovering invariant representations of data and to improving statistical methods for estimating models for the data. The data types considered include image and video data and also other data types (e.g., alphanumeric data, and audio, etc.). Attention is particularly directed to data analysis for image processing applications.

SUMMARY OF THE INVENTION

The invention provides methods and systems for compressing, transmitting and reconstructing data for video, audio and other applications.

A convex invariance learning framework is established for processing input data. In this framework, data is represented as a random collection of tuples. For example, images are represented as "a bag of pixels". Input image data, which may originally be obtained in standard vector representation as ordered collection of n-tuples (e.g., as ordered collections of pixel X and Y co-ordinates and intensity I), is reorganized by associating the X and Y spatial co-ordinates of a pixel with the pixel's intensity value I. This reorganization allows the order of pixels in the input image data to be randomnized to obtain the "bag of pixels" representation.

The invariant characteristics or properties of the data type (e.g., pixel correspondence in face images) are recovered from the randomized collection of n-tuples by maximum likelihood analysis. Each input image vector is associated with a variable transformation matrix that acts on the vector to reorder the collection of n-tuples in the vector. The transformation matrices may, for example, be permutation matrices or stochastic matrices that approximate permutation matrices. A convex cost function, whose variables are the input data vectors and their associated transformation matrices, is defined over a constrained space of the transformation matrices (e.g., permutation matrices). This cost function is minimized to find the most likely permutation matrices and pixel permutations in image data. This minimization process reestablishes common registration or correspondence between pixels in the image data. The minimization process also invariantly clusters or moves the image data vectors in to a linear subspace ("eigenspace") where they can be described or modeled by a reduced number of variables. The minimization process may be carried out using numerical techniques or kernel methods.

Principal component analysis may be used to find a sufficient or significant set of N eigenvectors (E) that span the linear subspace. Test results for face image data shows that the number N of significant eigenvectors can be a small number (e.g., N=20).

Input image data may be compressed by using the set of N eigenvectors as a basis set to encode the data. The input image data is first invariantly transformed (i.e., permuted) to the linear subspace spanned by the set of N eigenvectors and then projected on them (eigenvectors) to obtain a set of N scalar coefficients or eigenvalues. The set of N scalar coefficients provides a compressed representation of the image data. The compressed data can be transmitted as a set of N coefficients to a receiver. The transmitted image may be reconstructed at the receiver as a linear function of the set of N eigenvectors using the set of N coefficients.

BRIEF DESCRIPTION OF THE DRAWINGS

Further features of the invention, its nature, and various advantages will be more apparent from the following detailed description of the preferred embodiments and the accompanying drawings, wherein like reference characters represent like elements throughout, and in which:

FIGS. 3b and 3c are schematic illustrations of exemplary invariant data manifolds of the data of FIG. 3a. FIGS. 3b and 3c illustrate how the data points in the original set of data may be transformed along invariant data paths to lie in a lower dimension subspace in accordance with the principles of the present invention.

FIG. 8a illustrates a few of a set of (X, Y) point images of digits 3 and 9 that were used as an input set for joint invariance and model learning in accordance with the principles of the present invention.

FIG. 8b illustrates reconstructed images obtained by applying conventional PCA to the data of FIG. 8a.

FIG. 8c illustrates reconstructed images obtained by applying PCA to the data of FIG. 8a after joint invariance and model learning in accordance with the principles of the present invention.

FIG. 9a illustrates a few face images of an individual's face that were used as an input set for joint invariance and model learning in accordance with the principles of the present invention.

FIG. 9b illustrates reconstructed images obtained by applying conventional PCA to the data of FIG. 9a.

FIG. 9c illustrates reconstructed images obtained by applying PCA to the data of FIG. 9a after a joint invariance and model learning process in accordance with the principles of the present invention.

Further included in Appendices A and B are listings of "MATLAB" source code of computer programs for minimizing cost functions in accordance with the present invention.

DESCRIPTION OF THE INVENTION

The present disclosure provides methods and systems for compressing, transmitting and reconstructing data for video, audio and other applications. The methods and systems utilize model estimates of the data to compress data. The methods and systems establish data invariance and representation parameters for assembling training data suitable for model estimation. The methods and systems may utilize convex programming techniques to determine or learn the suitable invariance and data representation parameters for a data type. The learned invariance and data representation parameters for a data type are employed to generate training data for the model learning or estimation.

In an inventive method, the learning of the data invariance or representation parameters for a data type is explicitly conducted in conjunction with the learning or estimation of a suitable model for the data type. The learnt representation parameters and the learnt model may be used to encode, represent and compress sets of data, for example, for transmission. The compressed sets of data may, for example, be video, audio or other data types.

Figure 4:
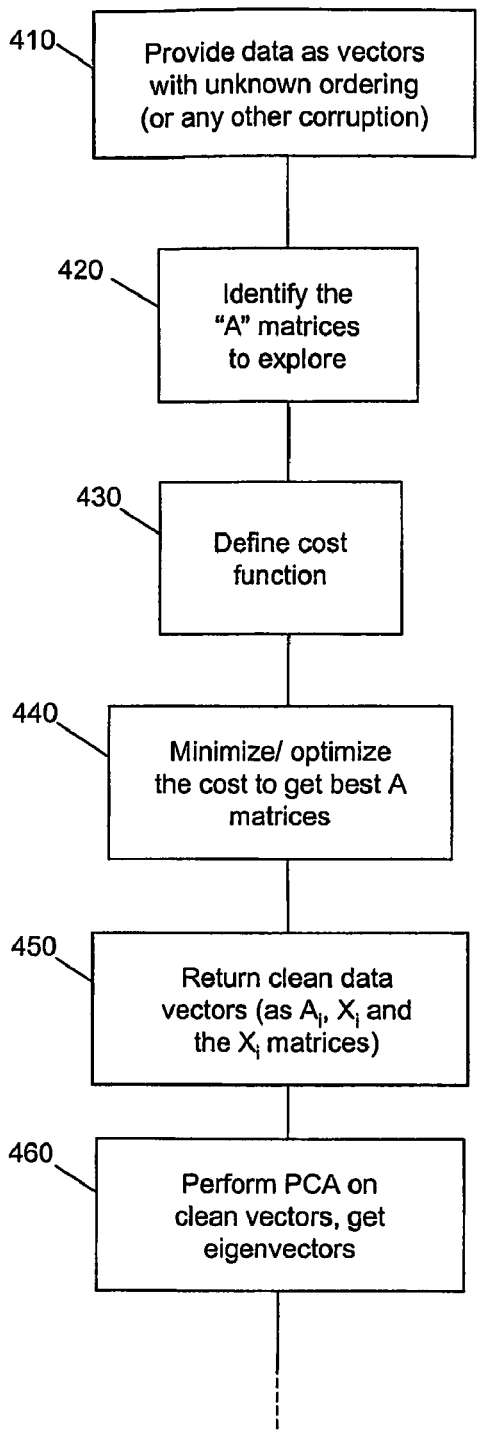
FIG. 4 is a flow diagram illustrating the steps of an exemplary process that can be used to compress, transmit and reconstruct data in accordance with the present invention.
Figure 4:
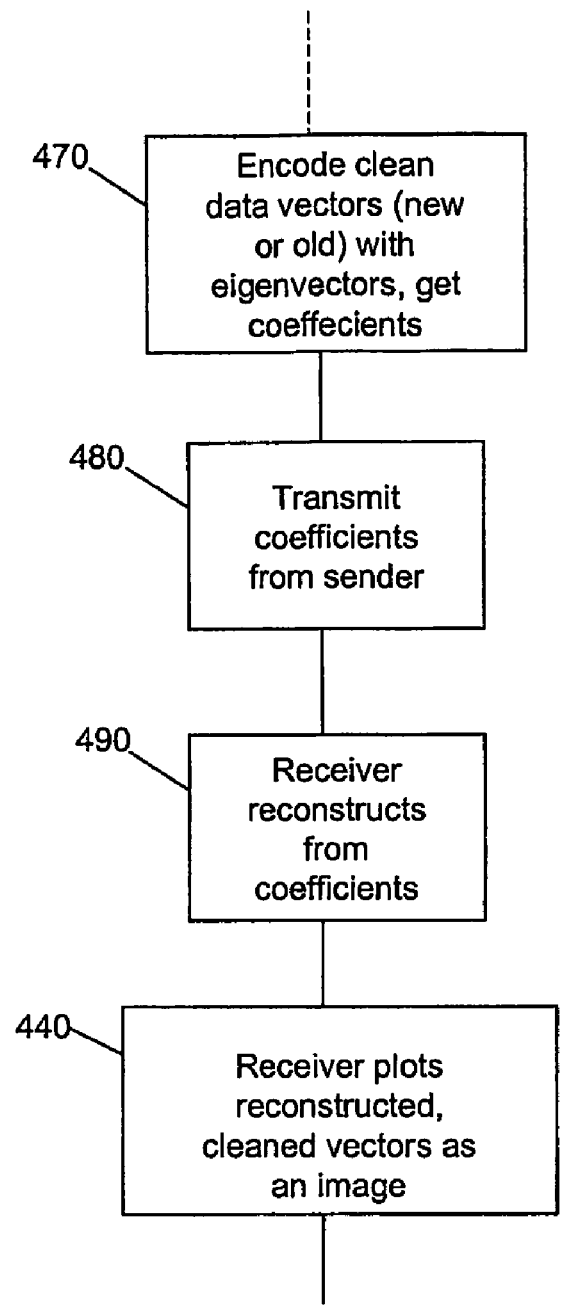
Figure 5:
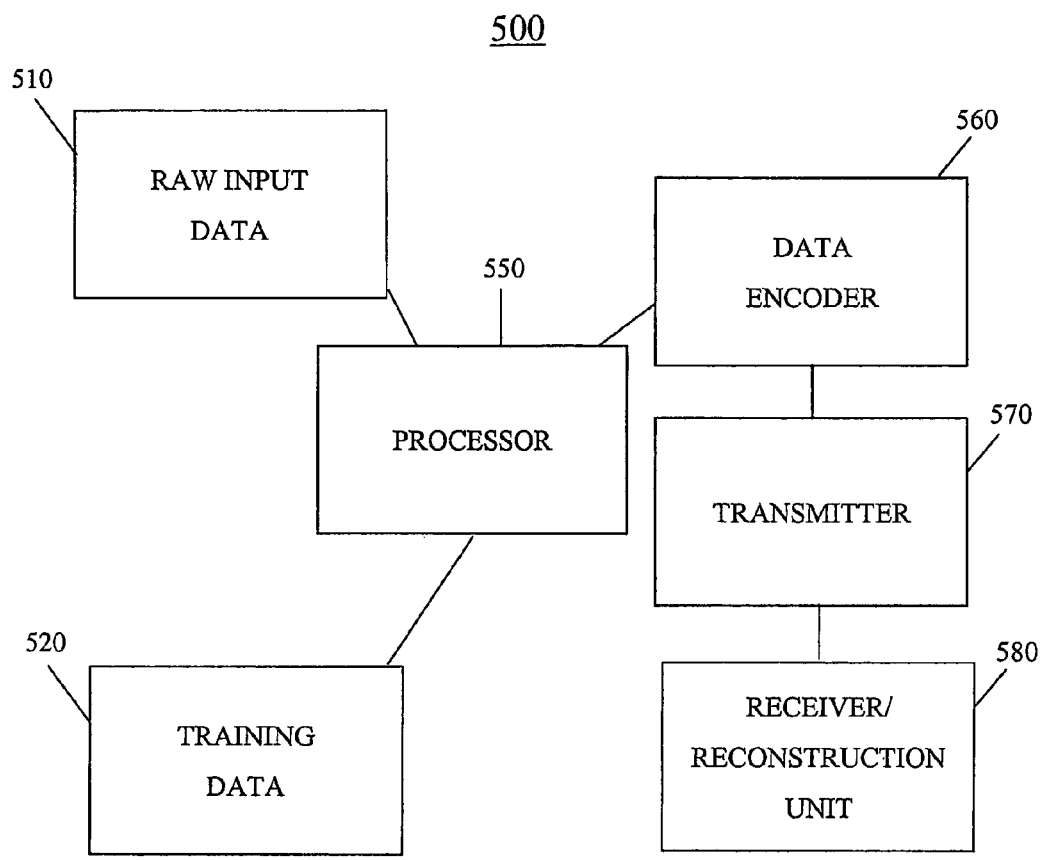
FIG. 5 is a schematic illustration of a system for compressing, transmiting and reconstructing data in accordance with the present invention.

Exemplary process 400 and system 500 for compression, transmission, and reconstruction of data are described herein with reference to FIGS. 4 and 5. However, several definitions and general features of the inventive methods and systems are described first herein to aid the understanding specific embodiments or applications of the inventive systems and methods that are described later on.

A feature of the learning systems and methods, which is common to all applications discussed herein, relates to transformation of a data set ("the original data set") under investigation into a transformed or normalized data set. In one embodiment the transformed or normalized data set is an equivalent enlarged or augmented data set (the "invariant data manifold"). An enlarged or augmented data set is useful for invariance analysis because the data in an original data set (e.g., image data), which is submitted for analysis, is usually represented in a form that does not preserve or contain information on the invariance or relationships between data elements. Image data, for example, is often represented by vectors (e.g., vector $x_1$ FIG. 1(a)) that fail to preserve information on the correspondence of data elements. This failure may be understood with reference to FIGS. 1a-1c.

Figure 1A:
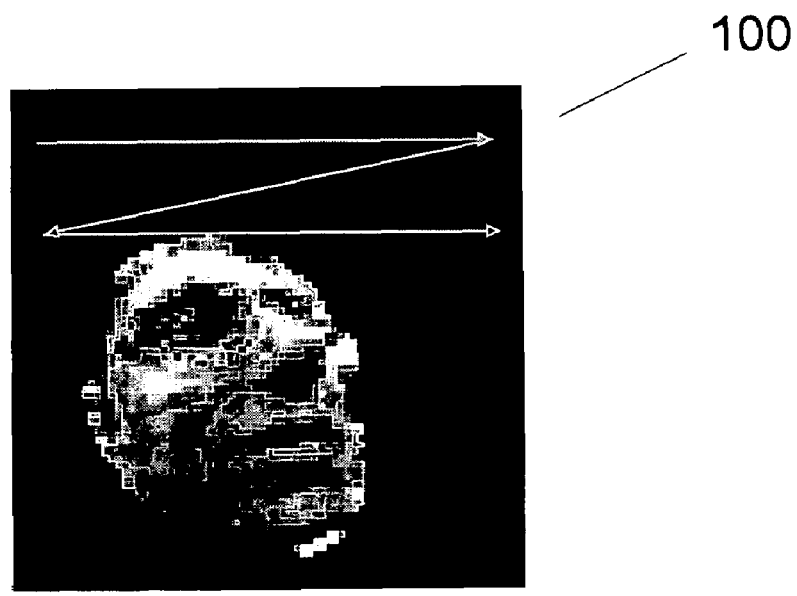
FIGS. 1a and 1b are schematic illustrations of a vectorization/rasterization process by which face image data is represented as ordered collections of pixel data.
Figure 1B:
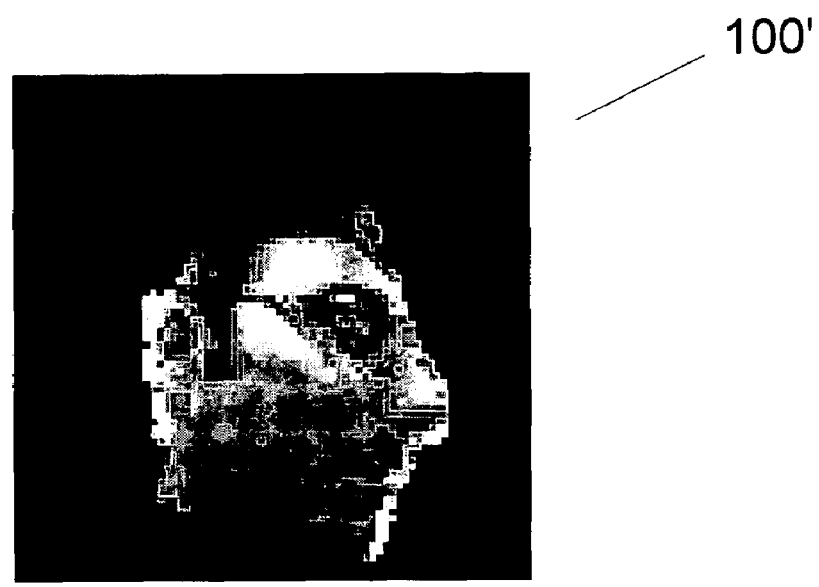
Figure 1C:
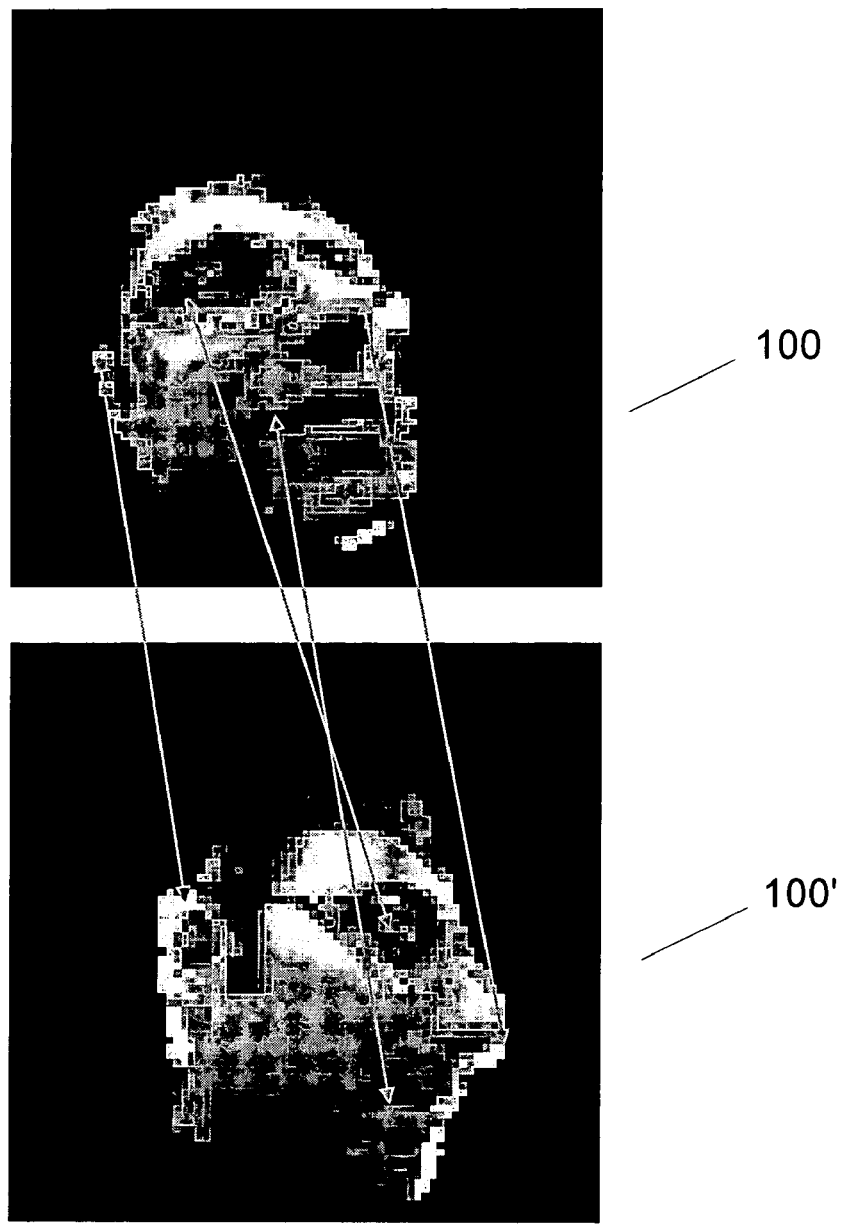
FIG. 1c. is a schematic illustration of the correspondence between pixels of the face image data of FIGS. 1a and 1b FIGS. 2a and 2b respectively are schematic illustrations of a vector data element x and an invariant surface or path over which the vector data element can be invariantly moved by application of transformation operators in accordance with the principles of the present invention.

FIG. 1a shows an exemplary digitized two-dimensional image 100 of a person's face, which is represented by a vector $x_1$. Vector $x_1$ sequentially lists pixel co-ordinates and pixel intensity (i.e. pixel tuples (X, Y, I)) in image 100. Vector image data like $x_1$ is prone to corruption as the acquired images/pixels of the person's face can morph, rotate, translate or permute. FIG. 1b shows, for example, another image 100' of the same person's face in another pose. Image 100' is represented by vector $x_2$. Both vectors $x_1$ and $x_2$ represent the same person's face. However, the two vectors sequentially list the pixel tuples in a different permuted order. The sequential listing of the pixel tuples in either vector is ordered according an external rasterization or vectorization scheme that does not, for example, recognize the spatial relationships or correspondence between specific pixels in the two images (some of which are depicted, for example, by arrows in FIG. 1c). Thus, neither vector $x_1$ nor $x_2$ contains adequate information on all other possible images of the person's face that may be acquired under different conditions (e.g., different poses, expression, illumination). Therefore, analysis of an original data set in which images are represented by vectors like $x_1$ or $x_2$ is unlikely to yield the invariant characteristics of images of the person's face.

The invariant data manifolds of the present invention are designed to supplement or restore image invariance information, which may be missing from the original data sets (e.g., vectors $x_1$ and $x_2$) that are submitted for invariance analysis. The invariant data manifolds may be used as data for further analysis (e.g., as training data for model learning), or as a suitably reformulated data set for face recognition or surveillance algorithms.

The data in an invariant data manifold includes data generated by applying suitable invariant transforms or operators "A" to the data elements in the original data set. An initial step in the invariance learning methods disclosed herein is to find or determine the suitable invariant transformation operators A. The invariant transformation operators A, which are initially undetermined, may be designed to effect one or more invariant operations suitable to the data type under consideration. It will be understood that the operators A acting on vector data elements (e.g., vectors $x_1$ and $x_2$) may be represented as matrices. The exemplary invariant operations for image data may include permutations, rotations, translation and scaling; for audio data may include pitch and ambient changes; for biological or molecular structure data may include protein folding, insertions or deletions; and for computer databases may include field swapping, reformatting, and scaling.

Figure 2A:
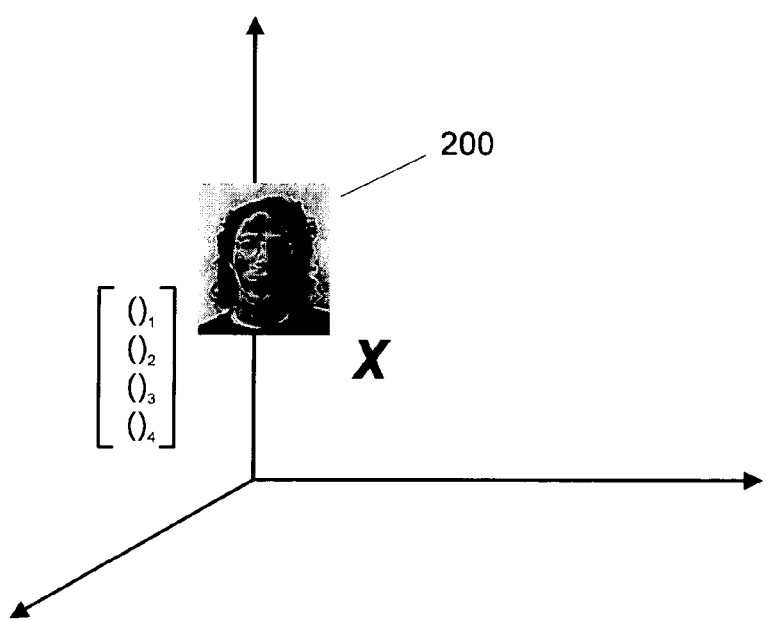
Figure 2B:
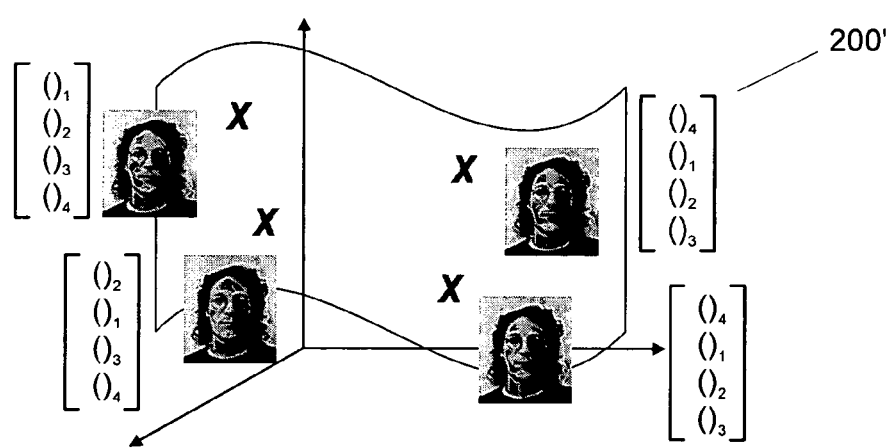

The suitable invariant transformation operators A are applied to each data element in the original data set to generate equivalent invariant representations of the data element. These equivalent invariant representations form an invariant surface or path over which the data element can be invariantly moved. FIGS. 2a and 2b respectively show examples of a data element (a face image vector $x_3$) and the invariant data manifold or surface 200'. Vector $x_3$ may, for example, represent a person's face 200. Conversely, invariant data manifold surface 200', which is generated by applying transformation operators A to the data elements of vector $x_3$, includes representations of the different equivalent images of the person's face 200.

Figure 3A:
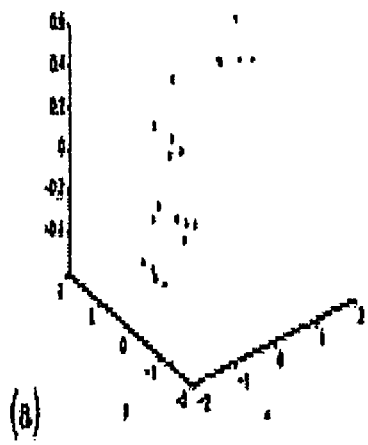
FIG. 3a is a scatter plot of an original set of data in $R^3$.
Figure 3B:
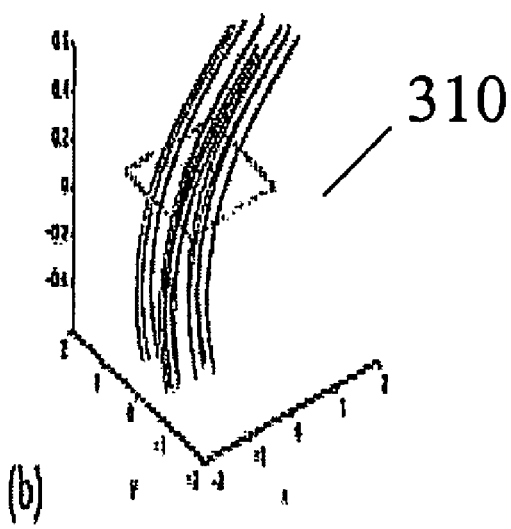

FIGS. 3a and 3b show, for example, how the consideration of an invariant data manifold instead of merely the original data set can be beneficial for model learning or estimation and for data compression. FIG. 3a shows an original set of data in $R^3$ as a scatter plot. The data may, for example, be face image data. Each data point may be a vector representation of a face image (e.g., with each vector organized as concatenation of sequential pixel tuples (X, Y, I)). The data includes the usual randomness or permutational variability associated with face image data due, for example, to the pose or illumination in which the face image is acquired. No dominant components are obvious from the scatter plot. Thus conventional modeling techniques (e.g., PCA) are unlikely to yield models by which the data can be described with a reduced number of variables. In contrast, FIG. 3b shows exemplary invariant data paths (i.e., one-dimensional manifolds) for each of the image data points in FIG. 3a. The invariant data paths are generated by applying appropriate invariant transformation operators A to each data point. Each data point of FIG. 3a may be visualized as being "mobile"—having the freedom to independently move along its respective invariant data path shown in FIG. 3b.

By its mobility, the image data as shown in FIG. 3b lends itself to model description by a reduced number of variables. For example, each image data point may be relocated (i.e. transformed) along its invariant data path, so that all or a significant number of the data points are distributed in a lower dimension subspace (e.g., plane or flat pancake shaped volume 310). PCA analysis of such a planar redistribution of data points is likely to provide a model which describes the data with a reduced number of variables or parameters (e.g., eigenvectors) than is obvious from the scatter plot of FIG. 3a.

Figure 3C:
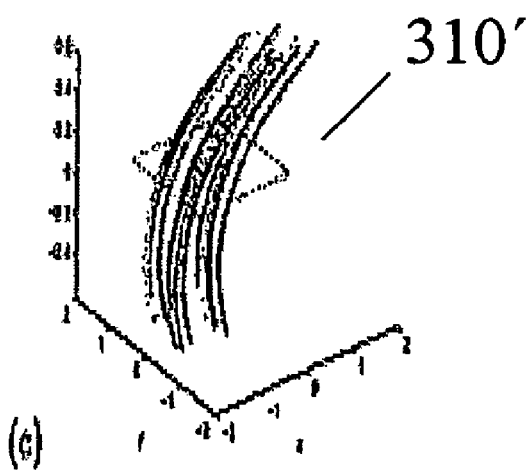

In practice, learning data invariance, generating invariant data manifolds and fitting or learning models from the invariant date manifolds in the manner described with reference to FIGS. 3a and 3b, all require computational effort and resources. Free or independent movement of all data points along the full extent of their invariant manifolds in an attempt to find reduced-variable configurations (such as plane or pancake volume 310) may be unnecessary. For some applications, it may be advantageous to limit the range of movement of image data points along their invariant data paths to portions that are likely to yield useful reduced-variable configurations. This may be accomplished by imposing a variable cost on the movement of a data point along its invariant manifold. The variable cost may, for example, increase the cost of movement of the data point over portions of the invariant data manifolds that are unlikely to yield useful configurations. In FIG. 3c, such portions are shown, for example, in lighter shades of gray. Data invariance, which limited by cost or other penalty functions, may be referred to herein as "soft invariance". FIG. 3c also shows the redistribution of data points along the invariant data manifolds so that they are relocated in about a plane or flat pancake shaped volume 310' (which may be similar or identical to volume 310 FIG. 1b). PCA or other model estimation algorithms acting on the data points in volume 310' are likely to provide a model which describes the data with a reduced number of variables or parameters in the same manner as described with reference to FIG. 3b.

Data of the type, which has been modeled, may be represented or encoded using the model parameters. For example, each image data point in FIG. 3A may now be coded as a set of eigenvalues (variances) using the eigenvectors of the model obtained by PCA of volume 310 or 310' (FIG. 3(b) or (c)). The encoding of data as a small set of eigenvalues permits compression of the data for transmission.

FIG. 4 shows several of the steps in exemplary process 400 that may be used in for the compression, transmission and reconstruction of data. The data may, for example, be video and/or audio data of the type used in television or radio broadcasting. Process 400 uses invariance learning and model learning in a convex programming framework to compress data. Process 400 may be implemented using any suitable combination of hardware and software. Process 400 may, for example, be implemented using system 500 (FIG. 5), which includes, a computer processor 550 and associated data storage units 510-520, a data encoder 560, a data transmitter 570, and a data receiver/reconstruction unit 580.

With reference to FIG. 4, initial steps 410-460 of process 400 relate to invariance learning and model learning for a given data type. These initial steps may be performed "off-line," for later compression, transmission and reconstruction of data sets of that data type. At initial step 410 of process 400, raw input data 510 of the particular data type is acquired for invariance learning and model learning in a convex programming framework. Raw input data 510 may, for example, face image data, which is represented by vectors. Thus, input data 510 may be a data set of T vectors, $X_1, \ldots, X_T$, which also possibly includes some corresponding labels $y_1, \ldots, y_T$.

Next at steps 420 and 430, a convex invariance learning framework is established. At step 420, suitable invariant transformation matrices A that are later used to generate additional invariant representations of raw input data 510 are identified for this framework. Each input data point 510, for example, is associated with an affine transformation matrix $A_t$ that operates linearly on the data point as follows: $\Sigma_j A_t^{ij} X_t^j$. The affine matrices $A_t$ are identified by subjecting them to a set of linear or non-linear equality/inequality constraints to limit or select the type of allowed invariant transformation of the data points. At step 430, a cost function $C(A_1, \ldots, A_t)$ is defined for learning data invariance (e.g., to investigate the range of likely invariant transformations $A_t$ of the data points). The optimal invariant transformations $A_t$ of the data points are those which minimize C(A). The cost function may be selected to be consistent with later data model estimation (at step 460). The cost function C(A) is selected to be convex. The convexity of C(A) ensures a unique 30 solution A at which C(A) is a minimum. Further, the domain of C(A) in subsequent computations is limited by constraints on the affine matrices. The affine matrices may be constrained in subsequent computations for minimizing the cost function by linear constraints, for example, in the following manner:

$$\min_A C(A) \text{ subject to } \sum_{ij} A_t^{ij} Q_{td}^{ij} + b_{td} \geq 0 \forall t, d \quad \text{(Equation 1)}$$

Figure 6:
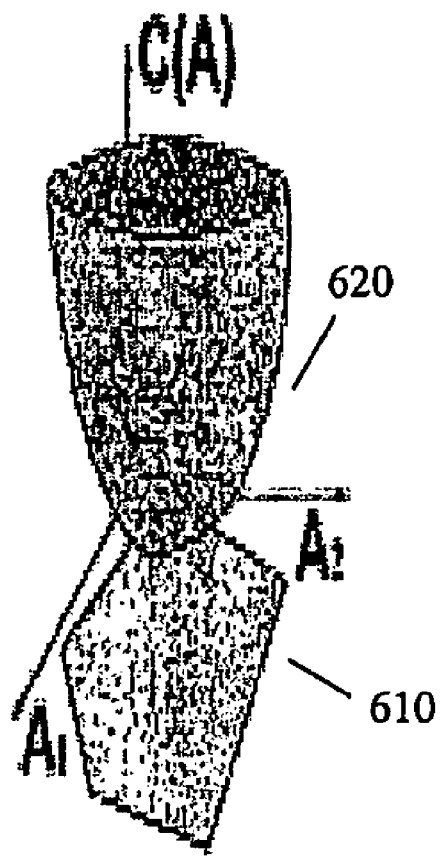
FIG. 6 is a schematic illustration of a cost function over a constrained space of transformation matrices in accordance with the principles of the present invention.

The linear (or non-linear) constraints define a convex hull of constraints on the affine matrices. FIG. 6 schematically shows a convex hull 610 of constraints on solution space of the affine matrices. This convex hull also delimits a region, manifold, or path of invariance around each data point for each combination of matrices $A_t$ that may be considered in minimizing the cost function C $(A_1, \ldots, A_t)$, for example, at subsequent step 440. These regions are schematically shown as surface 620 in FIG. 6.

The constraints on the affine matrices A may be empirically selected, for example, in consideration of the expected invariant properties of the data. For image data, the affine matrices may, for example, be limited to those having one or more of the following data transformation properties or characteristics: permutation and correspondence, permutation subgroups, clustering, latent variable, selection, translation, rotation and scaling. Optionally, an additional penalty function $P_t$ may be applied to each matrix A to favor certain invariant configurations over other invariant configurations (i.e. to achieve soft invariance).

$$C(A) \leftarrow C(A) + \Sigma_t P_t(A_t).$$

At step 430 of process 400, data model estimation criteria are integrated into the convex invariance framework set up at step 420. In the integrated framework, the cost function C (A) is defined to be an explicit convex function of the transformation matrices A and the data set X. The model estimation criteria may, for example, be based on standard principles of maximum likelihood estimation or discriminative estimation. When conventional Gaussian maximum likelihood estimation principles are implemented, the cost function C(A) may, for example, be defined as either as a Gaussian mean estimator, C(A)=trace(Cov(A X)), or a Gaussian covariance estimator C(A)=|Cov(Ax)|. (For convenience in the description of process 400, more mathematical formulations of both Gaussian estimators and other equations are provided herein only after description of all the steps of process 400). Both Gaussian estimators have the beneficial invariance learning property of transforming or moving data $X_i$ in to a low-dimension linear subspace (e.g., FIG. 3b volume 310).

At step 440 of process 400, the optimal matrices $A_i$ (min) that minimize the cost function C(A) are determined. Processor 550 may compute or solve for the optimal matrices $A_i$ (min), using, for example, quadratic or sequential quadratic programming or other programming techniques (e.g. iterated singular value decomposition (SVD,) or Kuhn-Munkres algorithms). The programming techniques that are used for computing the optimal matrices $A_i$ (min), may be used in conjunction with suitably defined bounds on the cost function. The optimized data vectors $A_i$ (min) $X_i$, also are established at step 440. These optimized data vectors correspond to data $X_i$ that has been invariantly relocated by application of the optimal matrices $A_i$ (min) in to a low-dimension linear subspace (e.g., FIG. 3b volume 310).

At optional step 450, the optimal matrices $A_i$ (min) and the optimized data vectors $A_i$ (min) $X_i$ may be stored or provided for future use. The optimized data vectors $A_i$ (min) $X_i$ may, for example, be stored as a training data set 520 in system 500. The optimal matrices $A_i$ (min) and optimized data vectors $A_i$ (min) $X_i$ also may be provided to data encoder 560 (FIG. 5) for future use.

Further, at step 460, a data model may be learnt from training data set 520 by applying suitable data model learning techniques. For example, PCA may be applied to training data set 520 to determine a sufficient number N of its principal components or eigenvectors. For face image data, a sufficient number of eigenvectors N may, for example, be about 10 or 20. The set of N eigenvectors $(E_1, \ldots, E_{10}, \ldots)$ may be stored or provided to both data encoder 560 and data receiver/reconstruction unit 570 in system 500 for future use. For convenience, the low dimensional subspace of data values spanned by training data set 520 may be referred to hereinafter interchangeably as "the eigenspace" or "the model eigenspace".

The later steps 470-495 of process 400 utilize the previously determined set of N eigenvectors (E) and the optimal matrices $A_i$ (min) for compressing input data sets and to reconstruct compressed/transmitted data sets.

At step 470, input data sets (e.g., vectors $X_1, \ldots, X_T$), which are submitted for compression/transmission, are encoded using the set of N eigenvectors (E) as a basis set. The value of an input data vector which has been relocated in to the model eigenspace (e.g., $A_i$ (min) $X_i$, step 440) is projected on to the basis of N eigenvectors (E) to obtain a set of N eigenvalues or coefficients. This set of N coefficients represents the compressed equivalent of the input data vector.

New input datum (e.g., vector $X_{T+1}$) that is submitted for compression/transmission, may first be "cleaned up" by invariantly relocating it to a low-dimension linear subspace (e.g., the model eigenspace) in the manner of steps 410-450. A transformation matrix $A_{T+1}$ that invariantly relocates vector $X_{T+1}$ to the model eigenspace may be found by reminimizing the full cost function C $(A_1, \ldots, A_{T+1})$ by varying all $A_i$.

Optionally, suitable approximations may be used to estimate $A_{T+1}$. For example, $A_{T+1}$ be estimated by using previously determined matrices $A_i$ (min) for I=1, to T, and perturbatively minimizing the cost function C ($A_{1,min}$ ... $A_{T+1}$) only with respect to $A_{T+1}$. Alternatively, the new matrix $A_{T+1}$ can be estimated by maximizing the likelihood under a Gaussian model with the estimated mean and covariance of the transformed training data. Then, invariantly relocated data value $A_{T+1}$ (min) $X_{T+1}$ is projected on to the N eigenvectors (E) to obtain a set of N coefficients describing the vector $X_{T+1}$.

Next at step 480, the set of N coefficients representing an input data vector $X_i$ may be transmitted from a signal transmitter (e.g., transmitter 570) to a receiver (e.g., receiver/reconstruction unit 580). At step 490, the received set of N coefficients and the previously acquired set of N eigenvectors ($E_1$, ..., $E_{10}$, ...) are used to reconstruct a version of the input data vector $X_i$. The reconstructed version corresponds to the representation of the vector $X_i$ in the model eigenspace. Then at optional step 495, the reconstructed image may be displayed as an image or further processed, for example, for recognition.

Figures 7A, 7B:
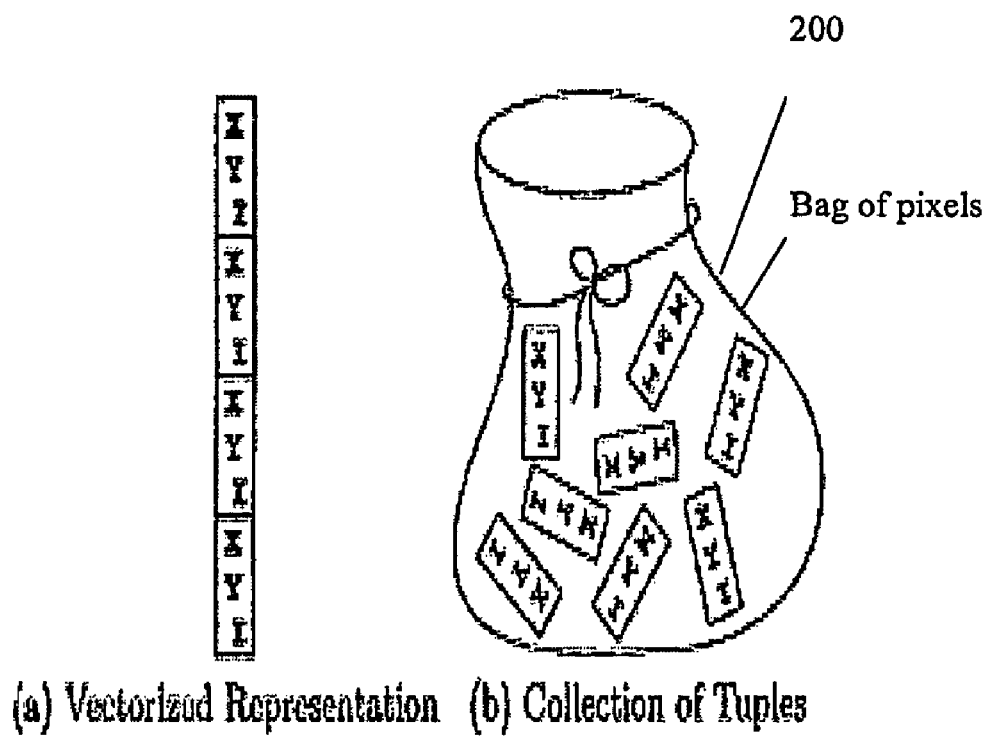
FIG. 7a and 7b are schematic illustrations of a vectorized representation of an image datum and its representation as "a bag of pixels" in accordance with the present invention.

It will be understood that process 400 as described above can be modified or tailored as desired or necessary for specific applications. For example, for processing vectorized image data it may be desirable to recognize the permutation and correspondence invariance characteristics of images, which are ignored by vector representation of the images (e.g., vector $x_1$ and $x_2$, FIGS. 1a and 1b). Accordingly, it may be desirable that the invariant transformation matrices A that generate invariant representations of the vector data are permutation matrices. A permutation matrix A acting on a vector reshuffles or reorders the vector data elements (e.g., pixel tuples (X, Y, I), FIGS. 1a and 1b). The invariant data manifold (e.g., manifold 200) of the image data obtained by action of the permutation matrices A may be viewed as a randomized collection of pixel tuples (X, Y, I) or figuratively as "bag of pixels." (FIG. 7). The invariance learning steps of process 400 (i.e., cost function minimization steps 430-450) may be expected to restore common registration or correspondence between image pixels in the bag of pixels. For example, face images may be aligned and registered so that pixels corresponding to the nose are mapped to the same position in the ordering of the optimized data vectors, while pixels corresponding the left eye map to a another consistent position in the ordering (see e.g., FIG. 3c).

In an version of process 400, the affine transformation matrices A used are required to be approximately permutation matrices, by requiring them to be element wise or block wise stochastic matrices. The affine matrices may, for example, be required to be doubly-stochastic, i.e., by imposing the linear constraints $\Sigma_i A_t^{ij}=1$, $\Sigma_j A_t^{ij}=1$ and $A_t^{ij} \geq 0$, at step 420 of the process. In this approximation, the permutation matrices are "soft," i.e. not restricted to have entries.

Further, in this version of process 400 in which the affine matrices A are constrained to be doubly-stochastic, a penalty function P(A) may be added to the cost function C(A). The penalty function may be designed to preclude or avoid degenerate solutions for $A_i$(min) at step 440. The penalty function may, for example, be a quadratic penalty function $-\lambda \Sigma_{imn} (A_i^{mn}-c)^2$, where the parameter $\lambda$ can be adaptively chosen to maintain the convexity of the cost function C(A).

Alternatively, degenerate solutions for $A_i$ (min) may be avoided by using suitable programming algorithms at step 440. Degenerate solutions for $A_i$ (min) may be avoided, for example, by locking a Gaussian mean estimate $\mu$ to be one of the raw data vectors (i.e. $\mu=X_j$) and setting its associated transformation matrix $A_j$, equal to the identity, i.e. $A_j=I$.

It will be understood that in general any suitable programming techniques may be used to solve for the optimal matrices $A_i$ (min) at step 440. For example, an axis-parallel optimization technique may be used to iteratively minimize the cost function C (A) that effectively is a constrained trace of a covariance.

$$\mathrm{trace}(MS) = \frac{1}{T} \sum_{mpnqi} A_i^{mn} A_i^{pq} X_i^q M^{pm} X_i^n - \frac{1}{T^2} \sum_{mpnqij} A_i^{mn} A_j^{pq} X_j^q M^{pm} X_i^n$$

where S=Cov (AX) and $M=S_0^{-1}$ is a gradient upper bound on an initial value of S that is computed variationally.

In this programming technique, only one A, matrix corresponding to one datum (the $t^{th}$ one) is varied in an iterative cycle. Further, only four scalar entries ($A_t^{mn}, A_t^{mq}, A_t^{pn}, A_t^{pq}$) of the $A_t$ matrix are updated in an iterative cycle, while all other entries are locked. The double-stochastic requirement on the matrices relate the four scalar entries by the equality constraints: $A_t^{mn}+A_t^{mq}=a$, $A_t^{pn}+A_t^{pq}=b$, $A_t^{mn}+A_t^{pn}=c$ and $A_t^{mq}+A_t^{pq}=d$. Thus, it is necessary to only compute one the four scalars (e.g., $A_t^{mn}$) in the iteration cycle. Further, scalar $A_t^{mn}$ also may be limited to satisfy the inequalities $A_t^{mn} \in [\max(0,a-d,c-1), \min(a,c,1+a-d)]$. After computing $A_t^{mn}$, the values of the other three entries can be obtained using the equality constraints. In this technique, different scalar and different matrices may be randomly updated in each iterative cycle. Further, upper bound (M) may be advantageously recomputed intermittently to obtain monotonic convergence to a global minimum of C(A).

It will be understood that the invariance learning or analysis using process 400 is not limited to image data that is represented by 3-tuples (X, Y, I). Other representations of image data may be similarly analyzed. For example, point-image data represented by (X, y) 2-tuples, or color video image data represented by (X, Y, R, G, B, time) 6-tuples may be analyzed. Further, any data type that can be represented as a collection of tuples may be similarly analyzed. The types of data represented by a collection of tuples include, for example, audio spectrograms that are represented by (amplitude, frequency) 2-tuples, and sequence data that are represented by (value, time) tuples.

EXAMPLE 1

Figure 8:
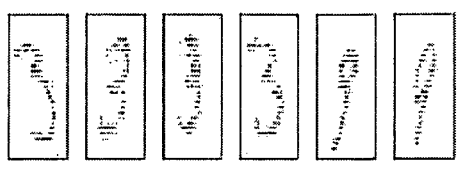
Figure 8:
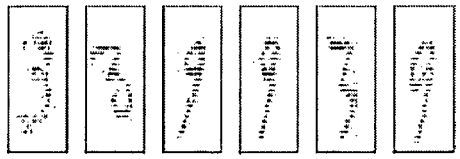
Figure 8:
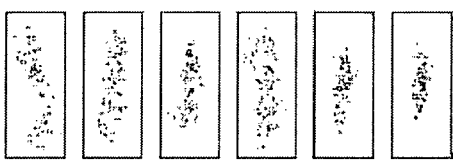
Figure 8:
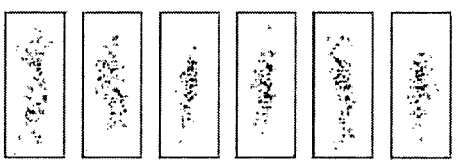
Figure 8:
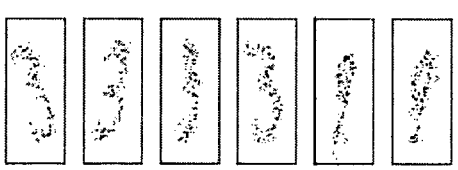
Figure 8:
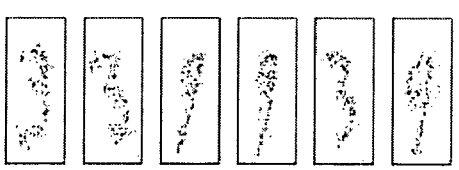

In this demonstrative example, joint invariance learning and model learning was performed using process 400 on a set of (X, Y) point images of digits. The digits 3 and 9 were represented as a collection of 70 (X, Y) pixels by sampling regions of high intensity in 28×28 gray scale images of the digits 3 and 9 (See e.g., FIG. 8a). The 70 (X,Y) pixels are seen as clouds of 2-dimensional points in the shape of 3's or 9's. Twenty such point images used as the raw input data set (FIG. 5, set 530). Optimal permutation matrices $A_i$ (min) were estimated for each of the twenty point images by iteratively minimizing a cost function C(A), and the permutation invariant eigenspace for PCA modeling of the data was identified (step 450 FIG. 4). PCA was then conducted to identify ten significant eigenvectors. Twenty original point images were reconstructed using these eigenvectors as a basis. FIG. 8c shows twelve of the reconstructed images corresponding to the original point images shown in FIG. 8(a). For comparison, conventional PCA and image reconstruction with a similar number of eigenvectors was also performed directly on the original point images shown in FIG. 8(a) (i.e. without permutation invariance learning). FIG. 8(b) shows reconstructed images in the case of this conventional PCA. The results confirm that conventional PCA and reconstruction of vectorized image data does not resolve correspondence between the pixels in an image (FIG. 8(a)). In contrast, the joint invariance learning and data model learning of process 400 preserves or recovers correspondence between pixels in an image (FIG. 8(c)).

EXAMPLE 2

In another demonstrative example, T=300 gray scale images of faces were obtained. The face images were of a single individual's face under various lighting, 3D pose and expression configurations. (See e.g., FIG. 9(a)). Pixels in skin-colored regions of the images were sampled to obtain a collection of N=2000 (X, Y, I) pixels for each face image. The 300 image data set was subject to permutation invariance and model learning using process 400. Due to the larger size of this input data set, during the minimization of the cost function C(A), the variable doubly-stochastic At matrices, which are of size O(N2) were stored as 2N scalars and estimated using the conventional so-called "Invisible Hand" algorithm. The data set was described by 20 significant eigenvectors (step 460 FIG. 4). Each of the N=2000 (X, Y, I) pixel image data thus was compressed to a set of 20 eigenvalues or coefficients. The images were reconstructed using the 20 coefficients. The reconstructed images are shown in FIG. 9(c).

For comparison, conventional PCA and image reconstruction with a similar number of eigenvectors also was performed directly on the original point images without permutation invariance and model learning. These conventionally reconstructed images are shown in FIG. 9(b).

Figure 9:
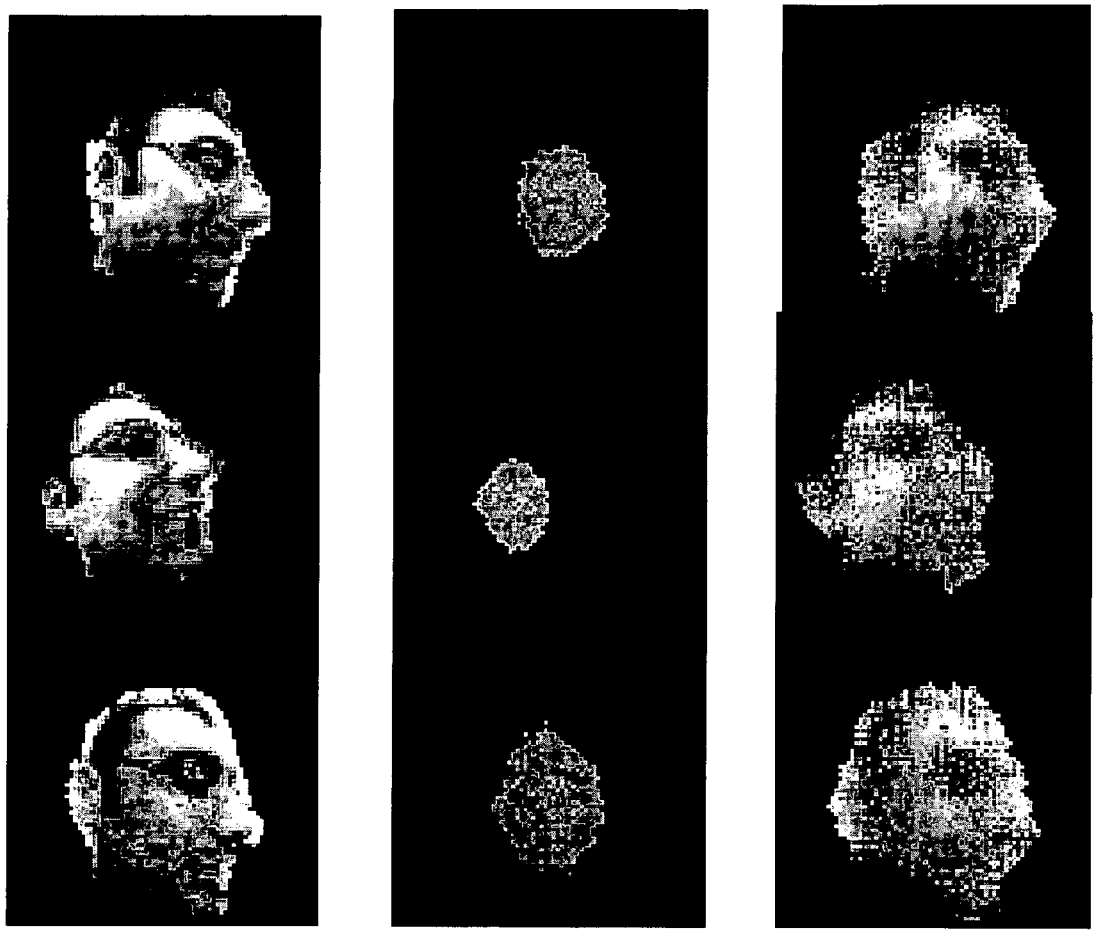

Comparison of the images shown in FIGS. 9(a)-(c) indicates that the reconstructed images have higher fidelity when permutation or correspondence is optimized. The permuted (X, Y, I) eigenvectors unlike the conventional PCA eigenvectors act smoothly, rotating and morphing the face images in three dimensions as well as following changes in illumination.

Figure 10:
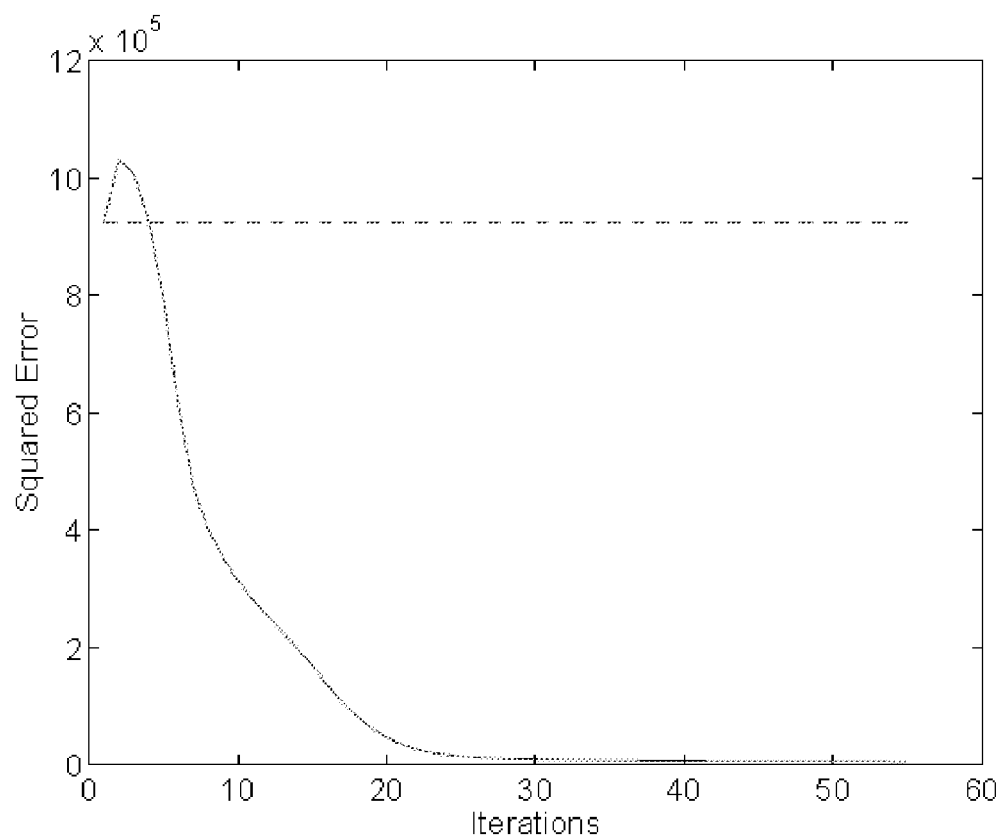
FIG. 10 is a graph comparing the squared reconstruction error for conventional PCA (FIG. 9b) with the reconstruction error resulting from the inventive joint invariance and model learning process (FIG. 9c).

FIG. 10 shows plots of the squared reconstruction error for the two types PCA performed on the face data image set. PCA under the convex invariance framework is seen to result in a reconstruction error, which is about three orders of magnitude lower than that obtained under conventional PCA.

EXAMPLE 3

In this third demonstrative example, several thousand audio spectrograms of 200 frequency bands were collected. The audio spectrograph for each of the 200 frequency bands was represented as 2-tuples of amplitude and frequency. This large raw data set was processed with permutational invariance learning in the manner similar to that described in example 2. The data set was described by 20 significant eigenvectors (step 460 FIG. 4). The audio spectrographs were reconstructed using 20 eigenvalues.

As in the previous examples, the data was also analyzed using conventional PCA without learning permutation invariance.

Figure 11:
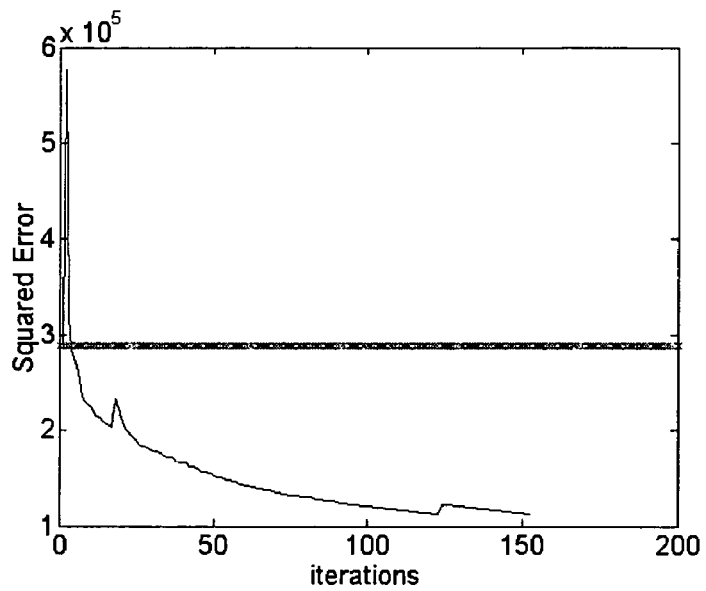
FIGS. 11a and 11b are graphs comparing the squared reconstruction errors for audio spectrograms reconstructed using conventional PCA and reconstructed using joint invariance and model learning processes in accordance with the present invention.
Figure 11:
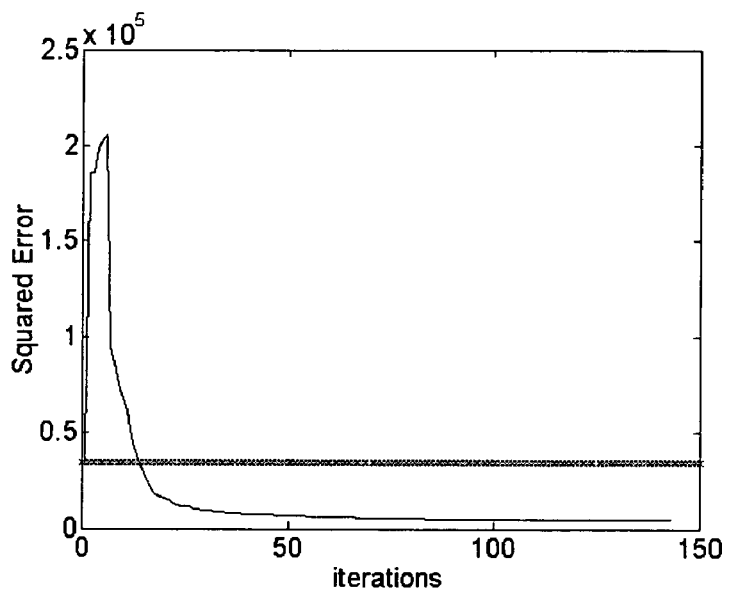

FIGS. 11(a) and 11(b), respectively, show plots of the squared reconstruction error for audio spectrographs taken from a close-talking microphone and from a wide area microphone. Both figures show the reconstruction errors obtained for PCA under the convex invariance framework, and for comparison that obtained for conventional PCA.

Software or computer programs used for processing data may be written in any suitable programming language. The computer programs may be provided on any computer readable medium or over computer networks. Exemplary computer programs for minimizing the cost function C(A) that are written in the C++ programming language are included in U.S. provisional application No. 60/436,597 included by reference herein.

Now reference is made to exemplary mathematical derivations of the convex Gaussian estimators that were earlier defined as either as a Gaussian mean estimator, C(A)=trace (Cov(AX)), or a Gaussian covariance estimator C(A)=|Cov (AX)|, for jointly performing model estimation while learning invariances at steps 420-430 of process 400. The first case corresponds to estimating a Gaussian mean μ with maximum likelihood assuming a fixed covariance for a Gaussian (normal) distribution N of A and X. Maximizing log-likelihood l(A, μ)=$\Sigma_t$ log N($A_t$ $X_t$;μ,I) over the model gives the usual estimate for the mean, $\hat{\mu}$=1T$\Sigma_t A_t X_t$. Reinserting this mean estimate into the log-likelihood gives:

$$l(A, \mu) = -\frac{TD}{2}\log(2\pi) - \frac{1}{2}\sum_t \|A_t X_t - \hat{\mu}\|^2$$

This log-likelihood can be converted via negation into an equivalent cost function over the $A_t$ matrices that is expressed as the trace of the covariance of the data:

$$C(A) = \text{trace}(\text{Cov}(AX))$$

This trace of the covariance is a convex quadratic function of the affine matrices A. Combined with linear constraints, this Gaussian mean estimator is directly solvable via a polynomial time quadratic program (e.g., at step 450 of process 400). This maximum likelihood criterion selects affine matrices that cluster data spherically, centering it towards a common mean.

The second Gaussian estimator case corresponds to more general Gaussian distributions with variable covariance, N(AX; μ, Σ). An imputed maximum likelihood covariance estimates $\hat{\Sigma}$=1/T $\Sigma_t(A_t X_t-\hat{\mu})(A_x X_t-\hat{\mu})^T$ leads to the following expression for log-likelihood:

$$l(A, \mu, \hat{\Sigma}) = -\frac{TD}{2}\log(2\pi) - \frac{T}{2}\log|\hat{\Sigma}| - \frac{1}{2}\sum_t (A_t X_t - \hat{\mu})^T \hat{\Sigma}^{-1}(A_t X_t - \hat{\mu})$$

After simplifications, the maximum likelihood setting of A is given by the equivalent cost function expressed as a determinant of a covariance:

$$C(A) = |\text{Cov}(AX)|$$

Minimizing C(A) according to this Gaussian criterion attempts to cluster data ellipsoidally such that it forms a low-dimensional subspace. It is well known that the determinant of a covariance matrix behaves like a volumetric estimator and approximates the volume of the data. Minimizing volume (e.g., step 440 process 400) is a valuable preprocessing step for PCA modeling since it concentrates signal energy into a smaller number of eigenvalues, improving the effectiveness and reconstruction accuracy in the PCA subspace (the model eigenspace). Solvable programs for minimizing C(A) can be set up because the determinant of a covariance is a convex function of the data A proof of which is as follows:

Proof Convexity holds trivially for 1-dimensional data since |Cov(X)| is merely a positive quadratic. It also holds for higher dimensional diagonal Cov(X) by factorization of the determinant. Rotational invariance of the determinant generalizes the result to arbitrary covariance. Alternatively, Hessian positivity can be verified by taking derivatives. Since the determinant of a covariance matrix is convex in the data, it is also convex in linear or affine matrices on the data. Therefore, $C(A)$ is again convex and Equation 1 results in a convex program. However, Equation 1 may not be solvable through quadratic programming alone. In such cases a solvable program may, however, be obtained by minimizing log $C(A)$ subject to upper bounding using a quadratic function in A. One such solvable program involves sequentially solving multiple quadratic programs interleaved with variational bounding steps until convergence to a global minimum solution is obtained.

An useful upper bound function on the $C(A)$ for this purpose is the logarithm of the determinant of the covariance i.e. $C(A)=\log |S|$, where $S=Cov(AX)$. The logarithm of the determinant S is concave over covariance matrices A. A proof of which may be obtained by verifying negativity of the Hessian derivative as described in D. Jakobson and I. Rivin, "External metrics on graphs," Forum Math, 14(1) 2002. Since $\log |S|$ is concave, it may be upper bounded by a tangential linear function in S that is equal and has the same gradient $M=S_0^{-1}$ at the current setting of $S=S_0$. The upper bound is then: $\log |S| \leq \text{trace}(MS) + \log |S_0| - \text{trace}(MS_0)$. It will be understood that rank deficiencies during matrix inversion can be avoided by adding a small reglilarizer.

Although the present invention has been described in connection with specific exemplary embodiments, it should be understood that various changes, substitutions, and alterations can be made to the disclosed embodiments without departing from the spirit and scope of the invention. For example, alternative methods or programs may be used instead of explicit quadratic programming techniques to compute the optimal transformation matrices $A_t$ that minimize the cost function $C(A)$. The alternative methods may be motivated, for example, by a desire for faster implementation of the bag of pixels and covariance learning method. Iterative algorithms advantageously may, for example, be used for computing a variational upper bound on the Gaussian covariance estimator cost function $C(A)$.

In one such iterative technique for minimizing $C(A)$ subject to an upper bound, instead of maximizing the full expression of the Gaussian covariance estimator cost function $C(A)$:

$$C(A) = \frac{1}{T} \sum_{mpnqi} A_i^{mn} A_i^{pq} X_i^q M^{pm} X_i^n - \frac{1}{T^2} \sum_{mpnqij} A_i^{mn} A_j^{pq} X_j^q M^{pm} X_i^n$$

a simpler version of $C(A)$ is utilized. In this version, each $A_t$ is estimated individually to align the current iterative point with the current Gaussian parameters locked:

$$C(A) = \frac{1}{T} \sum_t C(A_t) = \frac{1}{T} \sum_t \frac{1}{2}(A_t \vec{x}_t - \mu)^T M(A_t \vec{x}_t - \mu), \quad \text{(Equation 2)}$$

where $A_t$ is an $ND \times ND$ version of $A_t$ which is $N \times N$, and where the mean $\mu$ and the point $\vec{x}_t$ are vectors of length ND (e.g., like a vectorized version of the matrix $X_t$).

An upper bound on this version of $C(A)$ is obtained by noting the maximum eigenvalue of M is given by the scalar $\lambda$, according to the inequality:

$$\tfrac{1}{2}(a_t \vec{x}_t - \mu)^T M(A_t \vec{x}_t - \mu) \leq \tfrac{1}{2}\lambda(A_t \vec{x}_t - \vec{y}_t)^T(A_t \vec{x}_t - \vec{y}_t),$$

where $y_t$ is introduced as a new vector variable that is readily computed from the current setting of the variables on the left hand side using a formula defined below.

To derive the formula for $y_t$ it is useful to note that the curvature of the right hand side of this inequality is always greater than the curvature of the left hand side, since $M \leq \lambda I$ in the Loewner ordering sense. Further to apply this bound iteratively, the bound should make tangential contact at the old or previous iteration value $\tilde{A}_t$. To establish the tangential contact, derivatives of both sides of the inequality with respect to $A_t$ are set equal to each other to ensure equality at the previous value $\tilde{A}_t$:

$$M(\tilde{A}_t \vec{x}_t - \mu)\vec{x}_t^T = \lambda(\tilde{A}_t \vec{x}_t - \vec{y}_t)\vec{x}_t^T,$$

which can be solved for $\vec{y}_t$ as follows:

$$\vec{y}_t = \tilde{A}_t \vec{x}_t - 1/\lambda M(\tilde{A}_t \vec{x}_t - \mu).$$

The vector $\vec{y}_t$, which is a long ND vector, can be converted in to a $N \times D$ matrix $Y_t$ as vec $(Y_t) = \vec{y}_t$. The upper bound on the cost function $C(A)$ may then be described in terms of the Frobenius norm as follows:

$$C(A_t) \leq \lambda \| A_t X_t - Y_t \|_F^2 = \lambda \tfrac{1}{2} tr((A_t X_t - Y_t)(A_t X_t - Y_t)^T).$$

This upper bound expression involves the value of $\tilde{A}_t$ only as a product with $X_t$. Accordingly, it is necessary to explicitly store only the vector $\tilde{A}_t \vec{x}_t$ and not the previous $\tilde{A}_t$ during iterations. This feature beneficially reduces the computer memory or storage used in the computations.

An iterative solution for $A_t$ (which minimizes the cost function of Equation 2) can be obtained by viewing the above equations as a "matching" problem and by restricting $A_t$ to be doubly-stochastic. An exemplary iterative algorithm that may be used involves performing Sinkhorn updates by initializing the solution matrix as follows:

$$A_t(i,j) = \exp(-\tfrac{1}{2}\beta\|\vec{X}_j - \vec{Y}_i\|^2),$$

or using the matrix formula:

$$D_t = \vec{1} \, \text{diag}(X_t X_t^T)^T - 2 Y_t X_t^T + \text{diag}(Y_t Y_t^T) \vec{1}^T,$$

from which $A_t$ can then obtained element-wise by taking exponents as follows:

$$A_t = \exp(-\tfrac{1}{2} \oplus D_t)$$

During the iterations, the rows and columns of $A_t$ are repeatedly normalized until $A_t$ is doubly stochastic. In practice, about five normalization iterations are usually found to be sufficient. During the iterations toward convergence, the scalar $\beta$ is annealed from an initial value to higher values. Large values of $\beta$ encourage the $A_t$ matrix to go from being merely doubly stochastic to being more like a hard permutation matrix. This exemplary algorithm is similar to the previously mentioned Invisible Hand algorithm, which also keeps track of the $A_t$ entries and the row and column normalizers in logarithmic space for efficiency.

An alternative algorithmic method for minimizing the cost function of Equation 2, which explicitly returns a permutation matrix, is based on the conventional Kuhn-Munkres algorithm from graph theory. In this method the solution for $A_t$ is obtained by feeding the Kuhn-Munkres algorithm as follows $A_t = \text{KuhnMunkres}(-D_t)$. The Kuhn Munkres algorithm provides an integer solution. Thus it may be necessary to artificially decrease the value of λ to avoid local minimum solutions while iterating toward the global minimum in C(A).

The Kuhn-Munkres algorithm, which solves the known linear assignment problem in graph theory, also may be used to directly minimize the cost function C(A) defined in Equation 2. When the covariance is spherical (i.e. when M=αI) the expression for the cost function C(A) can be trivially reduced to:

$$C(A) = \text{constant} - 2\Sigma_i\Sigma_j A_{ij}W_{ij}, \text{ where } W_{ij} = \Sigma_d Y_i^d X_j^d.$$

Thus, minimizing C(A) is equivalent to maximizing the linear assignment problem LAP (A), where $$LAP(A) = \sum_i \sum_j A_{ij} W_{ij}.$$

However, in general the covariance is not spherical (i.e. M≠αI) and minimizing $\tilde{C}(A_t)$ poses a type of a quadratic assignment problem (QAP):

$$\tilde{C}(A) = \tfrac{1}{2}(A\vec{x}-\mu)^T M(A\vec{x}-\mu) = \tfrac{1}{2}\vec{x}^T A^T M A x - \mu^T M A \vec{x} + \text{const}$$

In this case, the Kuhn-Munlue algorithm can be used for minimizing C(A) by advantageously formulating the variational upper bound on C(A) so as to map the problem of the minimization of C(A) to a linear assignment problem (referred to herein as the "QAP bound").

The QAP bound on C(A) can be formulated as a linear assignment problem by approximating the inverse covariance matrix M in terms of K of its N eigenvalues λ and eigenvectors v as follows:

$$M = \sum_{k=1}^{K} \lambda_k \vec{v}_k \vec{v}_k^T.$$

In this approximation the non-constant terms of C(A) are written as:

$$\tilde{C}(A) = \sum_{k=1}^{K} \lambda_k \left(\vec{x}^T A^T \vec{v}_k\right)\left(\vec{v}_k^T A \vec{x}\right) - \mu^T M A \vec{x}$$

$$= \sum_{k=1}^{K} \lambda_k \left(\vec{x}^T A^T \vec{v}_k\right)^2 - \mu^T M A \vec{x}$$

$$= \sum_{k=1}^{K} \lambda_k \left(\sum_{ij} A_{ij} \sum_d V_i^d X_j^d\right)^2 - \sum_{ij} A_{ij} \sum_{d,d'} \mu_i^d M_{i,j}^{d,d'} X_j^{d'}$$

The first term of the expression is a quadratic and therefore is a convex function. Jensen's inequality for convex functions (i.e. f(Ex)<E(f(x))) can be exploited to define the QAP bound using the convex properties of the quadratic term. First, a K×N matrix Q having all non-negative entries is defined such that $$\sum_i Q_{ki} = 1, i = 1 \dots N.$$

Then, the matrix Q is introduced in quadratic first term in a manner that allows application of Jensen's inequality to define the QAP bound:

$$\tilde{C}(A) = \sum_{k=1}^{K} \lambda_k \left(\sum_{ij} A_{ij} \frac{Q_{ki}}{Q_{ki}} \sum_d V_{k,i}^d X_j^{d'}\right)^2 - \sum_{ij} A_{ij} \sum_{d,d'} \mu_i^d M_{i,j}^{d,d'} X_j^{d'} \le$$

$$\sum_{k=1}^{K} \lambda_k \sum_{ij} A_{ij} Q_{ki} \left(\frac{1}{Q_{ki}} \sum_d V_{k,i}^d X_j^d\right)^2 - \sum_{ij} A_{ij} \sum_{d,d'} \mu_i^d M_{i,j}^{d,d'} X_j^{d'}$$

For permutation matrices A that are used for invariance learning (e.g., in process 400), Q also satisfies the following relationship:

$$\sum_{ij} A_{ij} Q_{ki} = 1 \forall k.$$

Thus the the QAP bound can be further simplified as a linear assignment problem, which is readily solvable using the Kuhn Munkres algorithm:

$$\tilde{C}(A) \le \sum_{ij} A_{ij} \left[\sum_{k=1}^{K} \lambda_k \frac{1}{Q_{ki}} \left(\sum_d V_{k,i}^d X_j^d\right)^2 - \sum_{d,d'} \mu_i^d M_{i,j}^{d,d'} X_j^{d'}\right].$$

The QAP bound is a function of Q. In a program to minimize C(A) iteratively over A using Kuhn-Munkres operations, the QAP bound is minimized over Q. On defining $$P_{ki} = \sum_j A_{ij} \lambda_k \left(\sum_d V_{k,i}^d X_j^d\right)^2,$$

the problem of minimizing the QAP bound reduces to minimizations of the form:

$$\min_Q \sum_{ki} \frac{P_{ki}}{Q_{ki}} \text{ where } \sum_i Q_{ki} = 1 \forall k.$$

It is sufficient to carry out the minimization over Q for a single k value as the minimizations over Q for different k values are decoupled. Using Lagrange's method of undetermined multipliers for minimization over Q leads to the following expression for Q:

$$Q_{ki} = \frac{\sqrt{P_{ki}}}{\sum_l \sqrt{P_{kl}}}$$

Using this expression, the QAP upper bound on $\tilde{C}(A)$ may be written in terms of the old or previous iteration values of the A matrix, $\tilde{A}$ as follows:

$$\tilde{C}(A) \le \sum_{ij} A_{ij} \left[ \sum_{k=1}^{K} \lambda_k \frac{\Sigma_{i'} \sqrt{P_{ki'}}}{\sqrt{P_{ki}}} \left( \sum_d V_{k,i}^d X_j^d \right)^2 - \sum_{d,d'} \mu_i^d M_{i,j}^{d,d'} X_j^{d'} \right] \le$$

$$\sum_{ij} A_{ij} \left[ \sum_{k=1}^{K} \lambda_k \frac{\Sigma_{i'} \sqrt{\Sigma_{j'} \tilde{A}_{i'j'} \lambda_k (\Sigma_d V_{k,i}^d X_{j'}^d)^2}}{\sqrt{\Sigma_{j'} \tilde{A}_{ij'} \lambda_k (\Sigma_d V_{k,i}^d X_{j'}^d)^2}} \left( \sum_d V_{k,i}^d X_j^d \right)^2 - \right.$$

$$\left. \sum_{d,d'} \mu_i^d M_{i,j}^{d,d'} X_j^{d'} \right]$$

This expression presents the minimization of the QAP upper bound as linear assignment problem. The Kuhn Munkres algorithm or other faster heuristic algorithms such as QuickMatch by Orlin, may be used for iteration. In the iterative algorithms, the terms in the square bracket are used to weigh the entries of the A-matrix.

Appendix A and B list exemplary MATLAB source code that may be used implement the Kuhn-Munkres algorithms.

Another iterative optimization scheme, which may be to compute the optimal transformation matrices At that minimize the cost function C(A) of Equation 2 is based on singular value decomposition (SVD) methods. For an SVD-based optimization scheme, the matrix A is defined as the elementwise square of a rotation or orthonormal matrix B: A=B.*B. Thus, A is a doubly-stochastic matrix. An iterative solution for matrix B is obtained using SVD. B is then squared to update the current estimate of a $A_t$ matrix in the cost function.

For the SVD-based optimization scheme, an upper bound on C(A) may be formulated as a Procrustes problem on the matrix B. In this "Proscrustes approach," the Frobenius norm upper bound on $C(A_t)$ is written as:

$$\tfrac{1}{2}\lambda tr((AX-Y)(AX-Y)^T) \le \tfrac{1}{2}\omega \|BR-S\|^2 + c,$$

where the matrices R and S and the scalar c are Procrustes parameters that are required to satisfy the upper bound inequality.

Further, a small penalty may be added to the left-hand term to encourage the doubly-stochastic matrices $A_t$ to be hard or permutation-like:

$$\frac{\lambda}{2} tr((AX - Y)(AX - Y)^T) - \frac{\beta}{2} \sum_{ij} (A_{ij} - 1/N)^2 \le \frac{1}{2} \omega \|BR - S\|^2 + c$$

Larger values of β encourage more permutation-like behavior.

Recalling that each entry of A is $A_{ij}=B_{ij}^2$ the upper bound constraint on C(A) may be written in terms of the scalar entries of all matrices in a form suitable for SVD analysis as:

$$\frac{\lambda}{2} \sum_{id} \left( \sum_j B_{ij}^2 X_{jd} - Y_{id} \right)^2 - \frac{\beta}{2} \sum_{ij} (B_{ij}^2 - 1/N)^2 \le$$

$$\frac{w}{2} \sum_{ij} \left( \sum_k B_{ik} R_{jk} - S_{ij} \right)^2 + c$$

Solving the Procrustes problem for the optimum matrix B is done via a singular value decomposition [U, S, V]=svd $(RS^T)$ and then reassembling the matrix as $B=UV^T$ It will be understood that the foregoing descriptions of specific numerical methods to solve for the optimal matrices $A_t$ (min) are only illustrative and not limiting on the computational methods used for joint invariance and model learning. In some instances, kernel methods may be conveniently or effectively used. For example, it is straightforward to kernelize a Gaussian mean estimator cost function so that all subsequent calculations and inner products can be done in Hilbert space.

| APPENDIX A |
|---|
| ```
function [allAx] = bagsfastmainMunkres(allx,D,eps1,eps2)
[T,ND] = size(allx); N    = ND/D;
allAx = allx;
cost = [];
ind = 1;
maxKK = 400;
for kk = 1:maxKK
u = mean(allAx);
allMx = allAx-ones(T,1)*u;
[v,d] = eig(1/(T-1)*allMx'*allMx');
dd    = diag(real(d));
qq    = find(dd>(0.0001*eps1));
dd    = dd(qq);
COST = sum(log(dd+eps1))+eps2*sum(dd);
V = allMx'*v(:,qq);
for i=1:size(V,2)
     V(:,i) = V(:,i)/norm(V(:,i)); end
d = pinv(diag(dd+eps1));
L = max(max(d+eps2));
cost = [cost; COST];
figure(1); showpoints(allAx,D);
figure(2); plot(cost); pause(0.01);
figure(3); clf; [vv1,dd1]=eig(cov(allx)); plot(diag(dd1)); hold on;
[vv2,dd2]=eig(cov(allAx));
plot(diag(dd2),'r');
% recon = ((allax(ind,:)−mm)*v(:,60−K:60))*v(:,60−K:60)'+mm;
% for ind=2:T
if (ind>T) ind = 2; end;
Ax = allAx(ind,:);
x = allx(ind,:);
[Ax] = bagsfastMunkres(x,Ax,D,eps1,eps2,u,V,d,L);
u = u − (1/T)*allAx(ind,:) + (1/T)*Ax;
allAx(ind,:) = Ax;
ind = ind+1;
% end
end
``` |

| APPENDIX B |
|---|
| ```
function [Ax] = bagsfastMunkres(x,Ax,D,eps1,eps2,u,V,d,L)
% Uses Kuhn-Munkres with hard matching between X & Y
% Monotonically decreases the cost function and only explores
hard perms...
NxD = length(x);
NyD = length(Ax);
Nx = NxD/D;
Ny = NyD/D;
X = reshape(x,D,Nx)';
AX = reshape(Ax,D,Ny)';
for i=1:2
``` |

-continued

APPENDIX B

```
    y = Ax-2.000*(1/L)*(V*d*(V'*(Ax-u)') + eps2*(Ax-u)')';
    Y = reshape(y,D,Ny)';
    dA = (ones(Ny,1)*diag(X*X')'+diag(Y*Y')*ones(1,Nx)-2*Y*X');
    A = kuhnmunkres(-dA);
    AX = A*X;
    Ax = reshape(AX',1,Ny*D);
end
```

The invention claimed is:

1. A method for compressing data, comprising:

accessing data by a processor, the data being represented by vectors x, wherein each vector is an ordered set of pixels, and wherein each pixel comprises an n-tuple;

permuting the ordering of pixels in a set of data $S=(x_1, \ldots x_t)$, over a range of permutations to obtain a bag of unordered pixels representing the data, wherein the range of allowed permutations is linearly constrained;

associating a convex cost function with the permutations, wherein the cost function is derived by modeling data as a Gaussian distribution and identified as the determinant of a regularized covariance of the data;

minimizing the convex cost function over the constrained range of permutations to identify a linear subspace of the bag of pixels, wherein the linear subspace corresponds to the most likely invariant ordering of pixels in the set of data S;

performing Principle Component Analysis (PCA) to identify a set of N eigenvectors that span the linear subspace; and encoding data designated for compression using the set of N eigenvectors to represent the designated data as a set of corresponding N coefficients in the eigenspace.

2. The method of claim 1 wherein minimizing the convex cost function comprises minimizing the convex cost function iteratively using a variational upper bound on the cost function.

3. The method of claim 2 wherein the variational upper bound on the cost function is selected such that the minimization of the cost function is one of a quadratic cost, quadratic assignment problem or a linear assignment problem.

4. The method of claim 2 wherein minimizing the cost function comprises using one of quadratic programming, axis-parallel optimization, Procrustes approaches, singular value decomposition, or Kuhn-Munkres algorithms.

5. The method of claim 1 wherein encoding data designated for compression comprises first invariantly transforming the designated data into the linear subspace and then representing the data as a set of N eigenvalues.

6. The method of claim 5, further comprising reconstructing data in a vector representation from the set of N eigenvalues by linear combination of the eigenvectors.

7. A system for compressing data, comprising:

a processor configured to access raw input data being represented by vectors x, wherein each vector is an ordered set of pixels, and wherein each pixel comprises an n-tuple, the raw input data including a set of sample data $S=(x_1, \ldots x_t)$, wherein each vector $x_i$ is associated with a variable permutation operator that permutes the ordering of the pixels in the vector, wherein the data in set S is associated with a convex cost function which estimates the cost of permuting the ordering of pixels in S to obtain a bag of unordered pixels representing the data, wherein the range of allowed permutations is linearly constrained, and wherein the cost function is statistically defined as a determinant of a covariance of the data;

the processor being configured for minimizing the convex cost function over the constrained range of allowed permutations to identify a linear subspace of the bag of pixels, wherein the linear subspace corresponds to the most likely invariant ordering of pixels in the set of data S;

a principal components analyzer for identifying a set of N eigenvectors that span the linear subspace; and an encoder that compresses data by using the set of N eigenvectors as a basis set to encode the data.

8. The system of claim 7 wherein the processor comprises a convex program for minimizing the cost function over the constrained range of allowed permutations.

9. The system of claim 8 wherein the convex program comprises an iterative program and a variational upper bound on the cost function.

10. The system of claim 9 wherein the variational upper bound is such that the minimization of the cost function maps to one of a quadratic cost, a quadratic assignment problem and a linear assignment problem.

11. The system of claim 9 wherein the iterative program comprises one of a quadratic program, a Procrustes approach program, a singular value decomposition program, an axis-parallel optimization program, or a Kuhn-Munkres algorithm.

12. A system comprising:

a processor configured to access raw input data being represented by vectors x, wherein each vector is an ordered set of pixels, and wherein each pixel comprises an n-tuple, the raw input data including a set of sample data $S=(x_1, \ldots x_t)$, wherein each vector $x_i$ is associated with a variable permutation operator that permutes the ordering of the pixels in the vector, wherein the data in set S is associated with a convex cost function which estimates the cost of permuting the ordering of pixels in S to obtain a bag of unordered pixels representing the data, wherein the range of allowed permutations is linearly constrained, and wherein the cost function is statistically defined as a determinant of a covariance of the data;

the processor being configured for minimizing the convex cost function over the constrained range of allowed permutations to identify a linear subspace of the bag of pixels, wherein the linear subspace corresponds to the most likely invariant ordering of pixels in the set of data S;

a principal components analyzer for identify a set of N of eigenvectors that span the linear subspace; and an encoder that compresses data by using the set of N eigenvectors as a basis set to encode the data; and a transmitter for transmitting data compressed by the encoder to a receiver.

13. A system comprising:

a processor configured to access raw input data being represented by vectors x, wherein each vector is an ordered set of pixels, and wherein each pixel comprises an n-tuple, the raw input data including a set of sample data $S=(x_1, \ldots x_t)$, wherein each vector $x_i$ is associated with a variable permutation operator that permutes the ordering of the pixels in the vector, wherein the data in set S is associated with a convex cost function which estimates the cost of permuting the ordering of pixels in S to obtain a bag of unordered pixels representing the data, wherein the range of allowed permutations is linearly constrained, and wherein the cost function is statistically defined as a determinant of a covariance of the data;

the processor being configured form minimizing the convex cost function over the constrained range of allowed permutations to identify a linear subspace of the bag of pixels, wherein the linear subspace corresponds to the most likely invariant ordering of pixels in the set of data S;

a principal components analyzer for identifying a set of N of eigenvectors that span the linear subspace; and an encoder that compresses data by using the set of N eigenvectors as a basis set to encode the data; and a receiver having a reconstruction unit for decoding data compressed by the encoder, wherein the reconstruction unit uses the set of N eigenvectors as a basis set to decode compressed data.

14. A method for compressing image data, comprising:

receiving image data represented by vectors x, wherein each vector is an ordered set of pixels, and wherein each pixel comprises an n-tuple;

permuting the ordering of pixels in a set of data $S=(x_1, \ldots x_t)$, over a range of permutations to obtain a bag of unordered pixels representing the data, wherein the range of allowed permutations is linearly constrained;

associating a convex cost function with the permutations, wherein the cost function is derived by modeling data as a Gaussian distribution and identified as the determinant of a regularized covariance of the data;

minimizing, with a processor, the convex cost function over the constrained range of permutations to identify a linear subspace of the bag of pixels, wherein the linear subspace corresponds to the most likely invariant ordering of pixels in the set of data S;

performing PCA, with a principal components analyzer, to identify a set of N eigenvectors that span the linear subspace; and encoding, with an encoder, data designated for compression using the set of N eigenvectors to represent the designated data as a set of corresponding N coefficients in the eigenspace; and outputting compressed data responsive to the encoding; wherein:
 (a) the receiving includes receiving data representative of a physical object or system with a data receiver, and the encoding results include compressed data that can be used to reconstruct a representation of the physical object or system; or
 (b) the outputting compressed data includes generating an encoded image data signal and transmitting the encoded image data signal on a physical channel.

15. The method of claim 14, wherein minimizing the convex cost function comprises minimizing the convex cost function iteratively using a variational upper bound on the cost function.

16. The method of claim 14 wherein encoding data designated for compression comprises first invariantly transforming the designated data into the linear subspace and then representing the data as a set of N eigenvector coefficients.

17. The method of claim 16, further comprising reconstructing data in a vector representation from the set of N coefficients by linear combination of the eigenvectors.

18. The method of claim 14, wherein:
 the receiving includes receiving data representative of a physical object or system with a data receiver and the method further includes reconstructing a representation of the physical object or system.

19. The method of claim 14, wherein the outputting compressed data includes generating an encoded data signal and transmitting the encoded data signal on a data transmitter.

* * * * *

UNITED STATES PATENT AND TRADEMARK OFFICE
CERTIFICATE OF CORRECTION

| | |
|---|---|
| PATENT NO. | : 7,788,191 B2 |
| APPLICATION NO. | : 11/132078 |
| DATED | : August 31, 2010 |
| INVENTOR(S) | : Tony Jebara |

It is certified that error appears in the above-identified patent and that said Letters Patent is hereby corrected as shown below:

Column 19, line 64, "a associated with a convex cost function which estimates" should read
--associated with a convex cost function which estimates--

Column 20, line 48, "a principal components analyzer for identify a set of N of" should read
--a principal components analyzer for identifying a set of N--

Column 21, line 1, "the processor being configured form minimizing the con-" should read
--the processor being configured for minimizing the con- --

Column 21, line 8, "of eigenvectors that span the linear subspace; and" should read
--eigenvectors that span the linear subspace; and--

Signed and Sealed this
Eighteenth Day of January, 2011

David J. Kappos
*Director of the United States Patent and Trademark Office*